T. SPURRIER.
Carriage Axle.

No. 90,968.  Patented June 8, 1869.

WITNESS
Percival Beckett.
John R. Clark

INVENTOR.
Thomas Spurrier

United States Patent Office.

THOMAS SPURRIER, OF SHARON, PENNSYLVANIA.

Letters Patent No. 90,968, dated June 8, 1869.

IMPROVEMENT IN CARRIAGE-AXLES.

The Schedule referred to in these Letters Patent and making part of the same.

*To all whom it may concern:*

Be it known that I, THOMAS SPURRIER, of Sharon, in the county of Mercer, and State of Pennsylvania, have invented certain new and useful Improvements in Carriage-Axles; and I do hereby declare that the following is a full, clear, and exact description thereof, reference being had to the accompanying drawings, and to the letters of reference marked thereon, which form a part of this specification.

The nature of my invention relates to devices, whereby friction is lessened on axles for vehicles, and at the same time forming as firm and substantial a bearing as those heretofore in use.

To enable others skilled in the art to make and use my invention, I will describe its construction and adaptation.

In the accompanying drawings—

Figure 1:
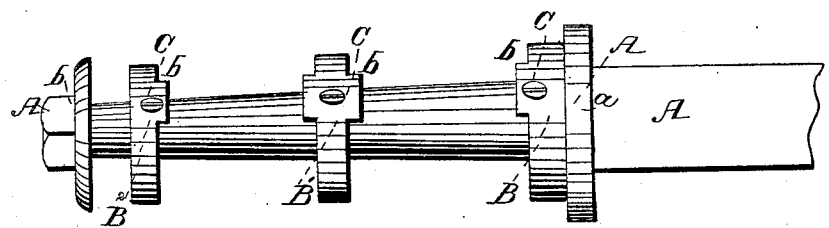

Figure 1 is an elevation of my improvement in axles for vehicles.

Figure 2:
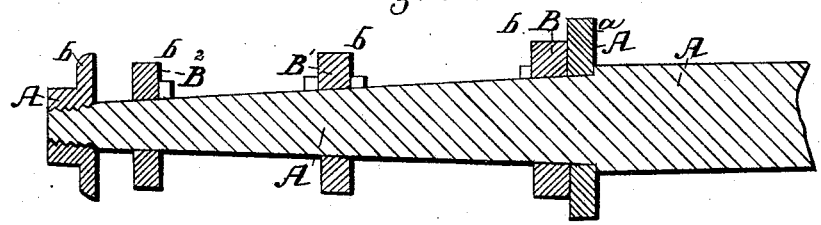

Figure 2, a section thereof.

Letters of reference denote parts.

On the bearing-part of an ordinary carriage-axle A, I place three or more circular washers, B, $B^1$, and $B^2$, in such positions as the washer B will be at or near the ordinary end washer $A^a$, and the washer $B^1$ be in or about the centre of the bearing, and the washer $B^2$ be at or near the ordinary nut $A^b$. These washers are attached to the axle A by means of set-screws C, or such like devices, screwed through the before-named washers, and let into the axle by means of a countersink, in such a manner that they will be and remain permanent and stationary; the washers B, $B^1$, and $B^2$, forming the sole bearing of the axle when in the ordinary thimble.

As carriage-axles have been heretofore constructed, they have been made in part with a full bearing on the tapered part. This has been found to be too large a surface for the purpose required, causing the bearing to heat, and consequently diminishing the full power.

Axles have also been made not having the full extent of the tapered part, a bearing-surface having only bearings at each extremity, the whole being solid; and when the bearings be worn, the axle has to be replaced or else turned up, and new thimbles provided, causing unnecessary labor and expense.

By the use of my devices, friction is lessened by simple expedients, which do not cause wear to the axle, not being part of the same. The sole bearing being upon the washers B, $B^1$, and $B^2$, they, when worn, can be detached, and replaced by others, without interfering with the axle or withdrawing the thimbles, thus saving expense, time, and labor.

The washers B, $B^1$, and $B^2$, are made of any suitable hard metal, (steel, hard cast-iron, or the like,) for the purpose of reducing wear, and at the points where the set-screws pass through them, they are provided with side flanges, $b$, by which a greater body of metal is afforded for purposes of strength, as well as to give greater bearing-surface for the hub of the wheel.

Having thus described the nature, construction, and adaptation of my improvements in carriage-axles, I am aware that bands have been employed upon a carriage-axle for affording bearings for its wheels, but as heretofore used they have been formed of soft metal, and confined upon the cylindrical ends of an axle by punching or countersinking, rendering their removal impossible without injuring them so much as to prevent their further use, the axle being likewise liable to be damaged thereby.

I do not broadly claim the use of bands or washers for affording bearings for carriage-wheels; but What I do claim as new, and desire to secure by Letters Patent, is—

The combination of the hard-metal washers B $B^1$ $B^2$, provided with side flanges, $b$, with the axle A, having tapering or conical ends, when secured thereon by set-screws C, or similar devices, substantially as described, so as to be removed, when worn, without injury to themselves or the axle, as set forth.

In testimony that I claim the foregoing as my own, I affix my signature, in presence of two witnesses.

THOMAS SPURRIER.

Witnesses:
PERCEVAL BECKETT,
JOHN P. CLARK.